United States Patent Office 3,485,778

Patented Dec. 23, 1969

3,485,778

STABILIZATION OF POLYURETHANE SYNTHETIC RESINS

Harald Oertel, Heinrich Rinke, and Friedrich Karl Rosendahl, Leverkusen, and Helmut Kleiner, Cologne-Stammheim, Germany, assignors to Farbenfabriken Bayer Aktiengesellschaft, Leverkusen, Germany, a German corporation No Drawing. Filed June 3, 1964, Ser. No. 372,360

Claims priority, application Germany, June 4, 1963, F 39,903

Int. Cl. C08g 22/04, 51/60

U.S. Cl. 260—18 10 Claims

ABSTRACT OF THE DISCLOSURE

Elastomeric polyurethanes are stabilized against discoloration and oxidation by having incorporated therein from about 0.1 to about 15% by weight of an N,N-dialkyl-carboxylic acid hydrazide, the alkyl groups having from 1 to 18 carbon atoms, the carboxylic acid moiety being derived from a monohydric or dihydric aliphatic, cycloaliphatic, or aromatic carboxylic acid.

This invention relates to polyurethane plastics and to a method of preparing the same. More particularly, it relates to a method of stabilizing polyurethane plastics against discoloration and oxidation.

Synthetic resins containing urethane groups, such as are obtainable in various ways by the isocyanate polyaddition process from polyisocyanates and high molecular weight polyhydroxyl compounds in general, if desired, with the inclusion of chain lengthening agents having active hydrogen atoms, e.g., polyols, water, polyamines, hydrazine, dihydrazine, polycarboxylic acid hydrazides, polysemi-carbozides and polycarbazinic acid esters, have found a wide range of uses as fibers, foils coatings lacquers, foam plastics and elastomers on account of their favorable properties (high tear strength, abrasion resistance, resistance to hydrolysis and in some cases, high elasticity). However, for a number of purposes, it is a disadvantage that these polyurethane synthetic resins have insufficient stability against discoloration under the action of light (sunlight or UV radiation), especially in the presence of oxygen (air). This is true particularly for synthetic resins having a relatively large surface, such as fibers, foils, coatings and form plastics. Furthermore, many of these polyurethane synthetic resins are insufficiently fast to waste gases.

Depending upon the components from which they are built up, these polyurethane synthetic resins differ in their sensitivity to oxidation and other degrading action. Thus, for example, polyester urethanes are relatively stable to the action of oxygen or ozone whereas polyether urethanes and especially polythioether urethanes are more easily subject to oxidative degradation, especially when they are at the same time exposed to light.

It is already known that polyurethane synthetic resins undergoing relatively little discoloration when exposed to light, are obtained when aliphatic diisocyanates, e.g., hexamethylene diisocyanate, are used for building up the macromolecules. The more reactive aromatic polyisocyanates which are preferentially used in technical process, especially the isomeric toluylene diisocyanates, phenylene - 1,4 - diisocyanate, diphenylmethane - 4,4'-diisocyanate and naphthalene - 1,5 - diisocyanate give rise to relatively rapid and strong discoloration to yellow or even brown in polyurethane synthetic resins on exposure to sunlight or to sources of artificial light, especially those having a high proportion of UV rays. The discoloration is frequently connected with loss in mechanical strength. The degree of discoloration generally increases in the given sequence of aromatic polyisocyanates. Different chain lengthening agents with reactive hydrogen atoms give rise to different stability to light in the resulting synthetic resins for one and the same polyisocyanate used, e.g., the resistance to light increases with the use of aromatic diamines, hydrazine or hydrazide compounds in the given sequence.

A large number of auxiliary agents are already known which are intended to reduce the impairment of the mechanical properties of the polyurethane synthetic resins by the action of light or oxygen with or without simultaneous action of sunlight or artificial sources of light, for example, various antoxidants or ultraviolet absorbents or combinations thereof, e.g., phenothiazine, phenyl - $\beta$ - naphthylamine, dinaphthyl - p -phenylene diamine, 2 - mercapto-imidazoline and a number of substituted phenols, especially derivatives of o,o'-dihydroxybenzophenone or diphenylmethane. Carbon black also has some effect as age resistor. Although a certain protection can be obtained by means of these additions, the self colors or resulting discolorations of the antoxidants or ultraviolet absorbents are a nuisance. In polyurethane synthetic resins based on aromatic polyisocyanates, the protective action is, in many cases, not adequate.

However, for colorless or pale pigmented polyurethane synthetic resins, especially highly elastic fibers, foils, textile coatings and foam plastics, it is necessary to use stabilizers which have little or no self color and will not discolor under the action of light and/or oxygen.

It is therefore an object of this invention to provide polyurethane plastics stabilized against discoloration and oxidation. It is another object of this invention to provide a method of stabilizing polyurethane plastics against discoloration and oxidation. It is another object to provide polyurethane foams, foils, coatings, threads and the like which are stable to light and oxidation. It is still another object of this invention to provide polyurethane plastics stable to waste gasses. It is another object of this invention to improve the ability of polyurethane plastics to take up dyes.

The foregoing objects and others which will become apparent from the following description are accomplished in accordance with the invention generally speaking by providing polyurethane containing from about 0.1 to about 15% by weight of an N,N-dialkyl-carboxylic acid hydrazide. Thus, the invention contemplates the stabilization of polyurethane plastics particularly those having recurring —Ar—NHCONH— and/or —Ar—NHCOO— groups where Ar is aromatic by incorporating therein N,N-dialkylcarboxylic acid hydrazides.

It has been found advantageous in this process that these compounds are colorless and remain colorless in the polyurethane synthetic resins to be stabilized after exposure to light and/or oxidation. In addition, the stabilizers, according to the invention produce a very marked improvement in the fastness to waste gases (action of nitrous gases or combustion gases). In addition, the ability to take up dyes, especially acid dyestuffs, is improved.

Moreover, in contrast to many of the substances hitherto customary, the new stabilizers produce no degradation inside the macromolecules of the polyurethane synthetic resins, even when heated to elevated temperatures (e.g., 100 to 140° C.). Furthermore, cross-linking reactions within the polyurethane synthetic resins, e.g., with ethylene imide compounds, epoxides, polyisocyanates or compounds which give off formaldehyde, are not inhibited by the presence of the stabilizers according to the invention.

The purely additive administration of stabilizers to polyurethane synthetic resins in any desired quantity without the need to alter the substances and quantities used or the components from which the synthetic resin is built up is found to be a great advantage. It has been found that under the action of light and/or oxygen or combustion gases, the stabilizers are used up, the stabilizer molecule being broken down. Thus, added stabilizers, even those which are attached to the macromolecule through reactive groups, leave the chains of the macromolecules unaffected when they themselves are used up by exposure to light.

Since the stabilizers generally do not react with the polyisocyanates under the reaction conditions, the polyaddition reactions for building up the polyurethanes synthetic resin may be carried out in the presence of the stabilizers.

It was not to be expected that compounds with the grouping

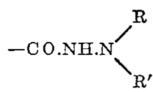

where R and R′ are alkyl groups which may be closed to a ring and may have hetero atoms and may be the starting point for further —CO—NHNRR′ groupings, would have such an extraordinarily powerful stabilizing effect against discoloration and degradation in polyurethane synthetic resins. Thus, the first visible color change in polyurethane synthetic resins containing the stabilizers according to the invention only occurs after 30 to 100 hours Fadeometer exposure whereas unstabilized polyurethane synthetic resins show a marked color change much earlier, for example, after 4 to 8 hours.

Although compounds having a structure similar to the stabilizers according to the invention, e.g., polyamides from suberic acid and piperazine, are relatively stable to light, they cannot be used as stabilizers against discoloration when added to the polyurethane synthetic resins. Also, for example, the compound derived from one mol adipic acid and two mols dimethylamine has no kind of stabilizing effect when added to polyurethane synthetic resins.

Tertiary amine (e.g. (N,N)diethyl - $\beta$ - aminoethylmethacrylate), which have also been proposed as stabilizers for polyurethanes containing the ureylene group and the group —(Ar—NHCONH)$_2$—, have a very much lower stabilizing effect than the compounds according to the invention.

Although it has already been disclosed in British patent specification No. 909,753 to use carboxylic acid hydrazides and their substitution products as ozone protective agents for rubber and for other high molecular weight compounds obtainable by polymerization, e.g. polyethylene or polypropylene, it was not possible to conclude from this that such compounds would be particularly effective stabilizers also for polyurethane synthetic resins which are obtainable by polyaddition or polycondensation processes and which are quite different in their construction, sensitivity to oxidation and discoloration mechanism from the above high molecular weight compounds. Furthermore, a number of the compounds given there as ozone-protective agents for rubber are not suitable or have an insufficient effect as stabilizers for polyurethane synthetic resins.

Thus, for example, carboxylic acid hydrazides such as sebacic acid dihydrazide can protect polyurethane synthetic resins against discoloration by light, these additives in many cases lead to degradation of the polyurethane synthetic resins when the latter are heated, e.g. in molding processes or in heat fixing processes (e.g., in the case of highly elastic polyurethanes fibers). Furthermore, these hydrazides cannot be added until the polyurethane synthetic resin is completely condensed and free from isocyanate because the hydrazides would otherwise react with the isocyanates to form inactive compounds.

Moreover, in the presence of free carboxylic acid hydrazides, in contrast to the use of carboxylic acid dialkyl hydrazides according to the invention, the required cross-linking reactions in the polyurethane synthetic resins which could otherwise be achieved by the addition of ethylene imide compounds, polyisocyanates or their breakdown products, epoxides or formaldehyde splitting compounds, are prevented or made difficult.

Corresponding hydrazide derivatives which can be derived from carboxylic acid hydrazides and carbonyl compounds, e.g., succinic acid-di-isopropylidene-dihydrazide, show similar degradation and disturbance of cross-linking reactions.

Hydrazides derivatives which have the grouping

—CO.NH.NH.CO.Z—

(Z=alkylene-, arylene-, —O—, —NH—), produced by acrylating carboxylic acid hydrazides (e.g. reacting with carboxylic acid chlorides, chlorocarbonic acid esters or isocyanates) have no stabilizing effect at all when exposed to (UV-) light, in contrast to the compounds with free hydrazide groups —CO.NH.NH$_2$ or the carboxylic acid-dialkyl hydrazides according to the invention.

Derivatives with the group —CS.NH.NRR′ cannot prevent discoloration on exposure to light; in most cases, polyurethane synthetic resins in fact undergo a much more appreciable brown discoloration with such compounds than without additives.

The stabilizers according to the invention of the carboxylic acid-N,N-dialkyl hydrazide type are derived from asymmetrically di-substituted hydrazines and carboxylic acids or their chlorides, esters or anhydrides. Any suitable asymmetrical hydrazine having the formula

H$_2$N.NRR′ may be used such as, for example, dimethylhydrazine, N,N-dipropylhydrazine, N,N-distearylhydrazine, N,N-methyl-isopropylhydrazine, N,N-di($\beta$-hydroxylethyl)-hydrazine, N,N-methylethyl-hydrazine, N,N-diisopropylhydrazine, N,N-methylbenzylhydrazine, N,N′-diamine-N,N′-dimethylhexane-1,6-diamine, N-aminopyrrolidine, N-amino-piperidine, N-amino-4-methyl-piperidine, N-amino-2,4-dimethyl-piperidine, N-amino-4-hydroxy-piperidine, N-amino-morpholine, N-amino-N′-methyl-piperazine, N-amino-N′-($\beta$-hydroxyethyl)-piperazine, N-amino-2,5-diethyl-N′-methyl-piperazine, N-amino-piperazine-N′-carboxylic acid-ethyleneimide, N-amino-4-di-ethylamino-piperidine, N,N′-diamino-piperazine, their alkyl substitution products and the like.

The acyl radicals in the carboxylic acid-N,N-dialkylhydrazides may be derived from any suitable mono- or polybasic carboxylic acids, such as, for example, acetic acid, trimethyl-acetic acid, lauric acid, stearic acid, cyclohexane-carboxylic acid acrylic acid, methacrylic acid, undecenic-10-carboxylic acid-1, oleic acid, lactic acid, $\epsilon$-oxycaproic acid, urea-N,N′-dicaproic acid, succinic acid, adipic acid, sebacic acid, maleic acid, fumaric acid, diglycollic acid, tartaric acid, propane-1,2,3-tricarboxylic acid, benzoic acid, p-methylbenzoic acid, m-chlorobenzoic acid, cinnamic acid, isophthalic acid, phthalic acid, terephthalic acid, the isomeric benzene-trcarboxylic acids, benzene-1,2,4,5-tetracarboxylic acid; the corresponding chlorides, esters, anhydrides and the like.

A particularly good stabilizing effect is obtained with dialkylhydrazide compounds which are derived from aliphatic carboxylic acids.

The carboxylic acid-N,N-dialkylhydrazides are obtainable by reacting N,N-dialkylhydrazines, for example, with carboxylic acid chlorides (with or without the presence of acid acceptors) or carboxylic esters by known methods. When (cyclic) anhydrides are used, compounds are obtained which contain carboxylic groups, e.g., succinic acid-mono-N,N-dialkylhydrazides.

When selecting stabilizers for polyurethane synthetic resins which are subjected to weathering or washing processes, in particular fibers, foils or textile coatings or lacquers, it is preferable to use stabilizers which are sparingly soluble or practically insoluble in water.

This is particularly the case with the high molecular weight stabilizers (molecular weight above 200, preferably above 500).

Examples of such stabilizers are N,N-dialkylhydrazide derivatives of polycarboxylic acids or reaction products of amino- or hydroxycarboxylic acid-N,N-dialkylhydrazides with phosgene, polycarboxylic acid chlorides, polychlorocarbonic acid esters of polyalcohols, polycarbaminic acid chlorides or isocyanates, e.g. urea-diheptanic acid-bis-dialkylhydrazides or reaction products of 1,6-hexane-diisocyanate or biuret-triisocyanate from 1,6-hexane diisocyanate with ε-amino-caproic acid-dialkylhydrazide.

There may be mentioned in addition polymeric carboxylic acid dialkylhydrazides which are obtainable by reacting N,N-dialkylhydrazines with polymers or copolymers of esters or chlorides or acrylic acid or methacrylic acid.

An acid insoluble as well as water-insoluble stabilization of polyurethane synthetic resins, which is particularly desirable for polyurethane fibers, may be obtained if the stabilizer molecule (soluble in acids) is directly bound chemically through suitable reactive groups to the polyurethane synthetic resins to be stabilized. Such "fixation" of the stabilizer to the polyurethane synthetic resin may be effected, for example, through —NCO, —COCl, —O—COCl, —NHCOCl, =C=C=O,

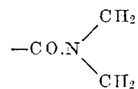

or

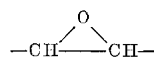

groups or through groups which split off isocyanate and which react under suitable conditions. Suitable isocyanate splitting groups are groups known per se which are produced by reacting NCO groups, for example with phenols, malonic acid, hydrocyanic acid or bi-sulphites.

Polyurethane synthetic resins which contain the grouping —Ar—NHCONH—, preferably as a portion of a grouping such as —Ar—NHCONHNH—, or —Ar, —NHCONHNHCO—, react particularly easily with ethyleneimide- or isocyanate (splitting) groups. If compounds containing isocyanate groups are used as stabilizers, the polyurethane synthetic resins should preferably contain end groups such as —OH, $—NH_2$, $—CONHNH_2$, $$—NHCONHNH_2$$

When —COCl, —OCOCl—, —NHCOCl— groups are used as attaching groups in the stabilizer, hydrogen chloride acceptors such as tertiary amines or aqueous alkali may be present in the reaction.

Some carboxylic acid-N,N-dialkylhydrazide derivatives show a tendency to complex formation when heavy metal salts are added, which may lead to the precipitation of the corresponding heavy metal complexes. Thus, Cu-II salts for example have a strong complex forming action. A similar, although considerably stronger tendency to complex formation is shown by high molecular weight compounds which contain groups that have been formed by the reaction of isocyanates with carboxylic acid hydrazides, semi-carbazides or carbazinic esters. Fixation between synthetic resins and stabilizer may also be obtained by complex formation between such polyurethane synthetic resins (see for example, German patent specification No. 1,123,-467) and the stabilizers according to the invention with heavy metal salts (e.g., Cu, Sn).

The stabilizers should be present in quantities of about 0.1 to 15% by weight, preferably 1 to 10% by weight, in the polyurethane synthetic resins or their starting compounds. To obtain a technically useful relation between stabilizer and polyurethane synthetic resin, it has been found that the stabilizer molecule should preferably contain the active grouping

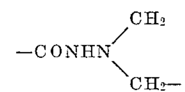

in a concentration of at least 5% by weight, preferably more than 25% by weight. Thus, the concentration in active light-protective groupings, e.g. in adipic acid-di-(N,N-dimethyl-hydrazide) is 78.4%, in stearic acid-N,N-dimethyl-hydrazide it is 31%.

For effective stabilization, it is desirable to have as high a content of active light protective grouping as possible, i.e., to achieve the best possible relationship between active grouping and molecular weight of stabilizer, because otherwise the quantities of stabilizer that have to be added to the synthetic resin are too high, which is, of course, undesirable.

Any method may be used for adding the stabilizers, the method being suitably adapted to the particular process used for the preparation of polyurethane. The relatively good solubility of carboxylic acid-N,N-dialkylhydrazides in many solvents such as dimethylformamide, dioxane, alcohols or chlorinated hydrocarbons and sometimes also in the starting materials for the preparation of polyurethane is found to be an advantage. Polyurethane compositions in solution, such as are used for producing highly elastic fibers or foils, are therefore preferably stabilized by the addition of dialkylhydrazide derivatives. By suitably varying the organic radicals in the stabilizer, its solubility and other properties may frequently be adapted to the required purpose. Thus, for example, compounds with long hydrocarbon radicals, such as stearyl-N,N-dimethylhydrazide, are easily soluble in reaction mixtures for lacquers or in high molecular weight polyhydroxyl compounds such as used, e.g., for the production of polyurethane foam plastics. In polyurethane elastomer foils or threads, for example, the above additives also reduce the adhesiveness so that for example, foils or threads can be worked without covering them with talcum.

In the production of lacquers, textile coatings and foam plastics, it has been found particularly advantageous that the polyaddition reactions leading to the formation of polyurethane can be carried out in the presence of the stabilizers without the stabilizing effect being thereby reduced. In some cases, a catalytic acceleration of the isocyanate reaction may occur due to the slightly basic character of carboxylic acid-N,N-dialkyl hydrazides.

The polyurethane synthetic resins to be stabilized may be obtained by generally known processes, but building up the synthetic resin by the isocyanate polyaddition process is to be preferred to synthesis by polycondensation processes e.g., via chlorocarbonic acid esters of polyhydroxyl compounds and diamines, although products of a given structure obtained by this process have practically the same properties as products of the same structure obtained by the isocyanate polyaddition process.

In most processes, a preadduct with terminal isocyanate groups (NCO preadduct) is first prepared by reacting polyhydroxyl compounds, which may be of high molecular weight, with excess quantities of polyisocyanates, and this preadduct is then treated with chain-lengthening agents or cross-linking agents.

The carboxylic acid-N,N-dialkylhydrazides are particularly effective for stabilizing polyurethane synthetic resins which are based on aromatic diisocyanates and which contain, in addition to urethane bonds, the group —NHCONH—. This group is preferably a part of a group such as —NHCONHNH—,

—NHCONHNHCO—, —NHCONHNHCONH—
—NHCONHNHCOO— or

—NHCONHNHCONHNHCONH—

(some of the hydrogen atoms on the nitrogen atoms may also be replaced by an organic radical). Such groups are formed by reacting isocyanate groups, for example, with water, primary or secondary amines, hydroxyamines, hydrazines, polyhydrazides, polysemi-carbazides, polycarbazinic esters, carbohydrazide as chain lengthening agents or cross-linking agents.

The last-mentioned polyurethane synthetic resins are also particularly suitable for reaction with stabilizers which contain reactive adhesive groupings, because their —NHCONH— group can react more easily than urethane groups with ethyleneimides, isocyanate (splitters) or epoxides. After the reaction, which may be brought about by heat, the stabilizers are attached to the synthetic resins by chemical bonding and are fast to washing.

When aliphatic diamines, hydrazines or hydrazides and similar compounds are used as chain-lengthening agents, their reaction with the substantially linear NCO preadducts is preferably carried out in highly polar solvents such as dimethylformamide, dimethylacetamide or dimethylsulphoxide. The stabilizers can easily be dissolved in the resulting solutions. On the other hand, the stabilizers may be added to the NCO preadduct solution before the chain-lengthening agent is added and the polyaddition may then be carried out. Solutions of polyurethanes such as may be obtained when polyurethanes which have been prepared free from solvent are dissolved in dimethylformamide or other solvents are particularly suitable for forming theads and fibers by dry or wet spinning processes, casting foils or coating (textile) bases.

The stabilizers may also be added to the liquid NCO preadducts (or their melts). Foam plastics may be produced from these NCO preadducts by known processes, for example, with water and/or polyols and/or inert blowing agents. Elastomers may be obtained by introducing polyhydroxyl compounds, e.g. butanediol-1,4 or aromatic diamines (e.g., 3,3′-dichloro-4,4′-diamino diphenylmethane) as chain-lengthening agents, and elastomer fibers may be obtained by spinning the NCO preadducts into solutions of aliphatic diamines.

When elastomers, foam plastics or lacquers are produced in a single stage process, suitable quantities of stabilizer may be added to one of the components, preferably to the high molecular weight polyhydroxyl compounds or the chain-lengthening agents (e.g. water), and the catalytic activity of the stabilizers may then accelerate the reaction.

On the other hand, the stabilizers may be incorporated in the solid polyurethane compositions, e.g., thermoplastic polyurethanes, in kneading machines or rolling mills or by homogenizing in extruder screws.

Applying the stabilizer, for example, by immersing the product in solutions or emulsions of the stabilizer or spraying the product with these solutions or emulsions is particularly suitable for foam plastics and in some cases, also for fibers.

Any suitable organic compound containing at least two active hydrogen containing groups may be used. It is preferred that the organic compound containing active hydrogen containing groups be substantially linear and have a molecular weight of from about 500 to about 5,000. Any suitable compound of this type may be used such as, for example, hydroxyl polyesters, polyalkylene ether glycols, polyhydric polythioethers, polyacetals and the like. Of course, the hydroxyl polyester may contain urethane groups, urea groups, amide groups, chalkogen linkages such as oxygen or sulfur and the like. Thus, the term "hydroxyl polyester" includes not only pure polyesters, but also polyester amides, polyester urethanes, polyether esters, polycarbonates and the like.

Any suitable hydroxyl polyester may be used such as, for example, the reaction product of a polycarboxylic acid and a polyhydric alcohol. Any suitable dicarboxylic acid may be used in the preparation of a polyester such as, for example, adipic acid, succinic acid, suberic acid, sebacic acid, oxalic acid, methyladipic acid, glutaric acid, pimelic acid, azelaic acid, phthalic acid, terephthalic acid, isophthalic acid, thiodiglycollic acid, thiodipropionic acid, maleic acid, fumaric acid, citraconic acid, itaconic acid and the like. Any suitable dihydric alcohol may be used in the reaction with the polycarboxylic acid to form a polyester such as, for example, ethylene glycol, propylene glycol, butylene glycol, hexanediol, xylylene glycol and the like. The hydroxyl polyester should have a molecular weight of from about 500 to about 5,000, an hydroxyl number of from about 30 to about 300 and an acid number of less than about 5.

Any suitable polyester amide may be used such as, for example, the reaction product of an amine or an amino alcohol with a polycarboxylic acid. Any suitable amine such as, for example, ethylene diamine, propylene diamine and the like may be used. Any suitable amino alcohol such as, for example, β-hydroxy ethyl amine and the like may be used. Any of the dicarboxylic acids set forth above with relation to the preparation of hydroxyl polyesters may be used in the preparation of polyester amides. The polyester amides may also be prepared by reaction of diol-diamides such as, for example, the reaction product of adipic acid and diethanolamide, terephthalic acid-bis-propanol amide with a dicarboxylic acid. The polyester amides should have a molecular weight, hydroxyl number and acid number comparable to polyesters.

The polyesters and the polyester amides may be reacted with isocyanates to prepare hydroxyl or amine terminated compounds containing urethane and urea linkages which are suitable for use in the preparation of the spinning solution of this invention. Any suitable isocyanate which will be set forth hereinafter may be used.

Any suitable polyether ester may be used as the organic compound containing active hydrogen containing groups such as, for example, the reaction product of an ether glycol and a dicarboxylic acid such as those previously mentioned with relation to the preparation of polyesters. Any suitable ether glycol may be used such as, for example, diethylene glycol, triethylene glycol, 1,4-phenylene bis-hydroxy ethyl ether, 2,2′-diphenylpropane-4,4′-bis-hydroxy ethyl ether and the like.

Any suitable polyalkylene ether glycol may be used such as, for example, the condensation product of an alkylene oxide with a small amount of a compound containing active hydrogen containing groups such as, for example, water, ethylene glycol, propylene glycol, butylene glycol, amylene glycol and the like. Any suitable alkylene oxide condensate may also be used such as, for example, the condensates of ethylene oxide, propylene oxide, butylene oxide, amylene oxide and mixtures thereof. The polyalkylene ethers prepared from tetrahydrofuran may be used. The polyhydric polyalkylene ethers may be prepared by any known process such as, for example, the process described by Wurtz in 1859 and in the "Encyclopedia of Chemical Technology," volume 7, pages 257–262, published by Interscience Publishers in 1951 or in U.S. Patent 1,922,459.

Any suitable polyhydric polythioether may be used such as, for example, the reaction product of one of the afore-mentioned alkylene oxides used in the preparation of the polyhydric polyalkylene ether with a polyhydric thioether such as, for example, thiodiglycol, 3,3′-dihydroxyl propylsulfide, 4,4′-dihydroxyl butylsulfide, 1,4-(β-hydroxy ethyl)phenylene dithioether and the like.

Any suitable polyacetal may be used such as, for example, the reaction product of an aldehyde with a polyhydric alcohol. Any suitable aldehyde may be used such as, for example, formaldehyde, paraldehyde, butyraldehyde and the like. Any of the polyhydric alcohols mentioned above with relation to the preparation of hydroxyl polyesters may be used.

For building up polyurethane resins, high molecular weight polyhydroxyl compounds having mainly terminal hydroxyl groups and a molecular weight of about 500 to 5,000 and a melting point below 60° C. are preferred.

Polyurethanes derived from diphenylmethane-4,4'-diisocyanate are particularly in need of stabilizing to prevent early discoloration after exposure to light.

The following examples may be given for chain-lengthening agents which may be used either individually or admixture: 1,4-butanediol, butene-2-diol-1,4, 1,6-hexanediol, 2,5-hexanediol, thiodiglycol, 1,3- and 1,4-hexahydroxylylene glycol, 1,3- and 1,4-cyclohexanediol, 1,4-phenylene-bis-hydroxyethylether, 1,5-naphthalene-bis-hydroxyethylether, glycerine-mono-allyl-ether, N,N'-bis-hydroxyethyl urea, N,N'-bis-hydroxyethylaniline and the like; amino alcohols, such as ethanolamine or propanolamine and the like; diamines such as ethylene diamine, tetramethylene diamines, hydrazine, N,N'-dimethyl hydrazine, N,N'-diamino-piperazine, 1,6-hexamethylene-bis-hydrazine, N,N' - dimethyl - hexamethylene-diamine-1,6-piperazine, 1,4 - diamino - cyclohexane, 4,4'-diamino-diphenylmethane, 4,4' - diaminodiphenyl-dimethylmethane, 1,3,5-triethyl-2,4-diaminobenzene, 3,3'-dichloro- or 3,3'-dimethyl- or 3,3'-dimethyl or 3,3'-dimethoxy-4,4'-diamino-diphenylmethane and the like; water, dicarboxylic acids, or hydrazides of dicarboxylic acids and disulphonic acids such as adipic acid dihydrazide, oxalic acid dihydrazide, isophthalic acid dihydrazide, thiodipropionic acid dihydrazide, tartaric acid dihydrazide, 1,3-phenylene-disulphonic acid dihydrazide and the like; carbodihydrazide as well as $\omega$-aminocapronic acid dihydrazide, $\gamma$-hydroxybutyric acid hydrazide, bis-semi-carbazide, as well as bis-hydrazine carbonic esters of glycols such as butanediol or ethylene glycol and the like.

In addition to the carboxylic acid-N,N-dialkylhydrazides to be used according to the invention, other UV stabilizers or antoxidants may be used which enhances the protective action against light or UV radiation. Examples of such stabilizers are compounds of the benzophenone or diphenylmethane type, e.g., 2,2'-dihydroxy-4,4'-dimethoxybenzophenone or 2,2'-dihydroxy-4,4'-dimethyl-6,6'-di-tertiary butyl-diphenylmethane. Other suitable compounds are 2-benzyl-6-tertiary butyl-4-methylphenol, 2,6 - diisopropyl-4-methylphenol, 4,4'-butylidene-bis-(3-methyl-6-tertiarybutyl-phenol), 2,5-di-tertiary amyl-hydroquinone, 2,6-di-tertiarybutyl-4-methylphenol or 1-acetyl-4-benzoyl resorcinol. Other compounds or combinations are given, for example, in Germany Auslegeschriften 1,126,603 and 1,106,490 and in U.S. Patent 3,351,608

The stability of polyurethanes to the action of light is markedly improved by the simultaneous presence of compounds having the group

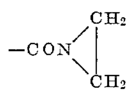

(or the

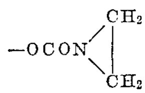

or

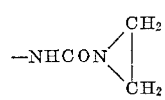

group) together with dialkylhydrazide derivatives. In many cases, there appears to be a synergistic action between the two compounds which enhances their effect. After prolonged heating to temperatures of, for example, 80 to 140°, the synergistic action of the ethylene imide compounds diminishes, probably due to ring opening of the aziridine, which leads in the case of polyaziridine derivatives to cross linking of the polyurethane compounds (see for example copending U.S. Patent 3,232,908 and U.S. application Ser. No. 257,749, now abandoned).

The polyurethane synthetic resins may also contain, in addition to the above described light protective agents or stabilizers, cross-linking agents such as polyisocyanates or their splitting products or epoxides, and pigments such as titanium dioxide in the rutile- or anatase modification, talcum, silicates or colored pigments or dyestuffs or compounds of divalent tin.

In the following examples, the improvement of the stability to light is generally indicated for elastic foils produced from solutions. The results are comparable to the effects obtained with threads, although the effect on strength and discoloration is sometimes observed to be greater on threads for a given time of exposure to light owing to the larger surface areas of threads.

The duration of the stabilization against discoloration in light may vary owing to the fact that the different polyurethane synthetic resins in themselves differ in their stability to light, as already described. However, the addition of carboxylic acid-N,N-dialkylhydrazides always provides a considerable improvement of the stability to light and waste gases.

Exposure to ultraviolet light is carried out with an Atlas Fade-O-Meter, Type FDA–R at a testing temperature of about 50–55° and a relative humidity of 45–50%, and the resulting discoloration of the synthetic resins is compared and the loss in strength determined by measurements of tear strength.

The test for fastness to waste gases is carried out in the usual manner by treatment with nitrous gases and/or by one hour's treatment with the waste gases of a Bunsen burner at a temperature of about 90°.

The invention is further illustrated but not limited by the following examples in which parts are by weight unless otherwise specified.

EXAMPLE 1

About 6,000 parts of an adipic acid-hexanediol-1,6-2,2-dimethyl-propanediol-1,3-polyester (molar ratio of glycols 65/35, OH number 60.0, acid number 1.40) are dewatered for about one hour at about 130° C./12 mm. Hg, and after cooling to about 70° C. are treated with about 1,354 parts of diphenylmethane-4,4-diisocyanate and about 1,846 parts of anhydrous chlorobenzene and the mixture is heated to an internal temperature of about 100° C. for about two hours. The NCO content is 1.840%.

About 8,520 parts of the NCO preadduct so prepared are introduced in the course of about 30 minutes, with vigorous stirring, into a 70° C. hot solution of about 182.5 parts of carbohydrazide in about 17,942 parts dimethylformamide and then treated with about 530 parts of a 33% pigment paste of titanium dioxide (rutile) and dimethylformamide. When cooled to room temperature, the colorless solution has a viscosity of 286 poises/20°. About 18.0 parts 1,6-hexane diisocyanate in about 20 parts chlorobenzene are stirred into 24,400 parts of the resulting solution having —NHCONH—$NHCONHNH_2$ end groups. The viscosity of the solution rises to 612 poises/20° in about 30 minutes.

Stabilizers dissolved in small quantities of solvent (dimethylformamide or dioxane) as well as poly-($\beta$-diethylamino-ethylmethacrylate) and suberic acid/piperazine polyamide are added to portions of the resulting elastomer solution in the percentages by weight (calculated on the solids content) given in Table I and distributed homogeneously in the solution by prolonged stirring. These solutions are then poured by suitable pouring apparatus onto glass plates and the solvent is evaporated off in a drying cupboard, initially at about 70° C. and then for about 45 minutes at 100° C.

A part of the foils is then heated in the drying cupboard at about 130° C. for about 60 minutes.

The resulting foils, about 0.1 to 0.2 mm. in thickness, are then irradiated with UV light in an FDA–R type Atlas Fade-O-Meter to test them for discoloration.

(c) About 1,980 parts of the NCO preadduct solution (NCO content 1.97%) is added with intensive stirring to a 70° C. hot solution of about 45.3 parts of carbohydrazide in about 4,540 parts of dimethylformamide, and after treating with about 40.3 parts of titanium dioxide (rutile), a solution of viscosity 355 poises/20° C. is obtained. After diluting with dimethylformamide to a solids content of about 21% and adding about 2.7 parts of hexane-1,6-diisocyanate, the viscosity of the solution is 380 poises/20° C.

TABLE I

| Stabilizer | M.P., Degrees | Quantity, Weight Percent | Exposure time in hours: 10 | 20 | 30 | 50 | Remarks |
|---|---|---|---|---|---|---|---|
| None | | | Almost colorless | Yellowish | Yellow | Yellow brown | |
| Adipic acid-di-(N,N-dimethyl-hydrazide) | 162–164 | 2 | Colorless | Colorless | Colorless | Colorless | |
| Succinic acid-mono-N,N-dimethyl-hydrazide | 156–157.5 | 2 | do | do | do | do | |
| Stearic acid-N,N-dimethylhydrazide | 65–67 | 2 | do | do | do | Yellowish | |
| Terephthalic acid-di-(N-N,dimethylhydrazide) | 272 | 2 | do | do | Yellowish | Yellow | |
| Poly-(β-diethylamino-ethylmethacrylate) | | 5 | do | Yellowish | Yellow | Yellow brown | |
| Suberic acid/piperazine polyamide | | 3 | Almost colorless | do | do | do | |

EXAMPLE 2

About 6,000 parts of the mixed polyester from Example but having an OH number 66 and acid number 1.53, are treated with about 1,493 parts of diphenylmethane-4, 4′-diisocyanate and about 1,875 parts chlorobenzene after dewatering for about 60 minutes at about 130° C./50 mm. Hg and cooling to about 70° C. The reaction mixture is then left to react in a boiling water bath at an internal temperature of about 95 to about 98°. The NCO content of the solution after cooling is 2.02%.

Portions of these preadduct solutions are converted with various chain lengthening agents to solutions of high molecular weight polyurethanes.

(a) About 1,950 parts of the above NCO adduct solution is rapidly stirred into a solution of about 60 parts of N,N′-diaminopiperazine in about 4,280 parts of dimethylformamide, and after pigmentation with about 40.5 parts titanium dioxide (rutile), a solution having a viscosity of 153 poises/20° (c.=26.4%) is obtained. After diluting with dimethylformamide to a concentration of about 21%, the solution is treated with about 6.16 parts of 1,6-hexane diisocyanate, the viscosity then rising to 168 poises/20° C.

(b) About 1,950 parts of the NCO preadduct solution is added with vigorous stirring to a solution of about 25.15 parts hydrazine hydrate in about 4,480 parts of dimethylformamide, and after adding about 40.4 parts of titanium dioxide (rutile), a solution having a viscosity of 200 poises/20° C. is obtained. After diluting with dimethylformamide to 22% solids content, about 4.10 parts hexane-1,6-diisocyanate are added, the viscosity then rising to 250 poises/20° C.

The stabilizers given in Table II are dissolved homogeneously in the given concentrations (calculated on the solids content) in solutions (a), (b) and (c) and foils are cast from these solutions with and without stabilizers (100° C. dry temperature), and these foils are then partly after-heated for one hour at about 130° C.

The films not exposed to light have the following appearance: (a) yellowish shade, which becomes deeper on further heating; (b) slight yellowish shade, which becomes slightly deeper on further heating; (c) colorless films.

Exposure in the Fade-O-Meter gives the following results for the films (dried at 100°):

TABLE II

| | Stabilizer | Exposure time in hours: 10 | 20 | 50 |
|---|---|---|---|---|
| (a) | Without | Unchanged lbs | Yellowish yellow | Yellow. |
| | 2.5% adipic acid-bis-dimethylhydrazide | do | Almost unchanged | Almost Unchanged. |
| | 2.5 terephthalic acid bis-dimethylhdyrazide | do | do | Do. |
| (b) | Without | Yellowish | Yellow | Brown yellow. |
| | 2.5% adipic acid-bis-dimethylhydrazide | Almost unchanged | Almost unchanged | Yellow. |
| | 2.5% terephthalic acid-bis-dimethylhydrazide | do | do | Do. |
| (c) | Without | Almost colorless | Yellow | Yellow brown. |
| | 2.5% adipic acid-bis-dimethylhydrazide | Colorless | Almost colorless | Yellowish. |
| | 2.5% terephthalic acid-bis-dimethylhydrazide | do | do | Yellow. |

Threads of a thickness of about 700–800 are cut from the films (a), (b) and (c) without additive and with about 2.5% adipic acid-bis-dimethylhydrazide as stabilizer. As compared with threads (b) and (c), the threads (a) show relatively low tensional forces:

| Modulus 300%: | Mg./den. |
|---|---|
| Thread (a) | 50 |
| Thread (b) | 95 |
| Thread (c) | 95 |

Results of measurements of the tear strength of the threads before and after exposure in the Fade-O-Meter are given in Table II(a).

TABLE II(a)

| | 0 hours: A | B | C | 50 hours: A | B | C | 100 hours: A | B | C |
|---|---|---|---|---|---|---|---|---|---|
| Threads (a): | | | | | | | | | |
| x | 0.68 | 555 | Pale yellowish | 0.29 | 537 | Yellowish | 0.09 | 378 | Yellowish. |
| y | 0.68 | 555 | do | 0.38 | 533 | Unchanged | 0.30 | 589 | Do. |
| Threads (b): | | | | | | | | | |
| x | 0.71 | 745 | Almost colorless | 0.12 | 321 | Yellow-brown | (1) | | Brown-yellow. |
| y | 0.71 | 745 | Colorless | 0.17 | 354 | Yellow | | | Yellow-brown. |
| Threads (c): | | | | | | | | | |
| x | 0.84 | 760 | do | 0.13 | 731 | Yellow-brown | 0.04 | 200 | Brown-yellow. |
| y | 0.84 | 760 | do | 0.53 | 595 | Colorless | 0.11 | 308 | Yellow. |

1 Mellow.

NOTE.—x=without stabilisator; y=with 2.5% adipic acid-bis-dimethylhydrazide; A=Tear-strengths (g/den.); B=Elongation at break; C=Colour.

EXAMPLE 3

About 500 parts of a polytetrahydrofuran (4.25% OH) are heated with about 54.4 parts of toluylene-2,4-diisocyanate and about 95 parts of chlorobenzene for about one hour at an internal temperature of about 80° C. and then treated with about 133 parts of diphenylmethane-4,4'-diisocyanate in about 200 parts of chlorobenzene and left to react for about one hour at about 98° C. internal temperature. NCO content of the preadduct after cooling to room temperature is 1.445%.

About 791 parts of the preadduct solution are introduced into about 13.3 parts of carbohydrazide dissolved in about 1,347 parts of 70° C. hot dimethylformamide and about 14.3 parts of titanium dioxide (rutile) are then stirred in. After adding 0.3 part of hexane-1,6-diisocyanate, the viscosity of the solution rises to from 298 to 511 poises/20° C.

About 2.5% adipic acid-bis-dimethylhydrazide (calculated on the solids content) are added to a portion of the elastomer solutions and distributed homogeneously.

Foils of 0.1 mm. thickness are made with suitable pouring apparatus from elastomer solutions with and without additives. A portion of the foils are dried for one hour at about 100° and a portion of these foils for another hour at 130° C. The foils are exposed in the Fade-O-Meter for 0, 10, 20, 30 and 50 and 100 hours.

TABLE III

| Stabilizer | Exposure time in hours | | | | | |
|---|---|---|---|---|---|---|
| | 0 | 10 | 20 | 30 | 50 | 100 |
| Without | Colorless | Pale yellowish | Yellow | Yellow | Yellow | Yellow-brown. |
| Adipic acid-bis-dimethylhydrazide | do | Colorless | Colorless | Colorless | Colorless | Almost colorless. |

Films without stabilizer have practically no mechanical strength left after 30, 50 and 100 hours exposure. Films containing stabilizer have substantially retained their strength.

TABLE IV

| Threads | Exposure in the Fade-O-Meter [1] (hours) | Tear-strength (g./den.) | Elongation at break (percent) | Appearance |
|---|---|---|---|---|
| Without stabilisator | 0 | 0.87 | 743 | Colorless. |
| | 10 | 0.66 | 684 | Yellowish. |
| | 40 | 0.07 | 280 | Yellow. |
| | 60 | 0.04 | 210 | Yellow-brown. |
| Plus 2.5% adipic acid-bis-dimethylhydrazide | 0 | 0.87 | 745 | Colorless. |
| | 10 | | | Do. |
| | 40 | 0.58 | 674 | Do. |
| | 60 | 0.52 | 656 | Yellowish. |

[1] The threads were exposed on both sides for equally long periods of time.

Similar stabilisation effects are found in elastomers which are prepared from the above NCO preadduct with hydrazine instead of carbohydrazide and which are treated with the stabilisers.

EXAMPLE 4

About 1,000 parts of an adipic acid/ethylene glycol-butanediol mixed polyester (molar ratio of glycols 1:1, OH number 55.0; acid number 0.70; water content 0.01%) are mixed with about 93.0 parts butanediol-1,4, about 14.4 parts titanium dioxide (rutile) and about 0.31 parts iron-(III)-acetylacetonate at about 60° C. and about 400 parts diphenylmethane-4,4'-diisocyanate is added rapidly with stirring. After a mixing time of about 3 minutes, the melt is poured into flat dishes and after heated for about 15 minutes in an oven heated to about 110°, and the polyurethane compound, which has already solidified by then, is removed and then granulated when cold. $\eta_i$-value of polyurethane compound at 25° measuring temperature $$\left(\eta_i = \ln \frac{\eta_{rel}}{C};\ C = 1\text{g.}/100\text{ cc.}\right)$$

dissolved in hexamethylphosphoramide at room temperature=1.26.

An elastomer solution is prepared by adding about 660 parts granulated polyurethane compound in portions to about 2,340 parts dimethylformamide at about 60 to about 70° with stirring until, after about 8 hours, solution is complete. The viscosity of the solution is 925 poises/20°. About 3.30 parts 2,5-ditertiary amyl hydroquinone are added to the solution and stirred until distribution is homogeneous.

Portions of the solution are treated with about 2.5% (calculated on the solid substance) adipic acid-bis-(dimethylhydrazide) or with the same quantity of terephthalic acid-bis-(dimethylhydrazide), dissolved in a small quantity of dimethylformamide, and the solution is homogenized by stirring.

The solutions, with and without added stabilizer, are cast into foils. After drying (60 minutes at 70°, 180 minutes at 110° in vacuo), the foils, which have a thickness of about 0.10 mm., are exposed in an Atlas Fade-O-Meter. The foils containing light-protective agent remain practically uncolored up to about 20 Fade-O-Meter hours whereas foils without light-protective agent are already distinctly discolored after 10 hours.

It is of course to be understood that any of the stabilizers or urethane polymers described throughout the specification may be used in place of those of the examples.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

EXAMPLE 5

About 600 grams of the polyester of Example 1 are heated with about 193 grams of diphenyl-methane-4,4'-diisocyanate and about 159 grams of chlorobenzene to about 98° C. for about 50 minutes. The NCO content of the preadduct after cooling is 3.57%.

About 400 grams of the NCO-preadduct solution are mixed with about 3.06 grams of water and about 775 grams of dimethyl formamide; the viscosity of the solution rises to 158 poises after standing for about one day. About 2% adipic acid-bis(as-dimethyl-hydrazide) are added to the solution and foils prepared from the solution are exposed in the Fade-O-Meter for the periods indicated below.

Without additive:

| | |
|---|---|
| 0 hours | Yellowish brown. |
| 20 hours | Brown-yellow. |
| 50 hours | Brown. |

With additive:

| | |
|---|---|
| 0 hours | Almost colorless. |
| 20 hours | Do. |
| 50 hours | Yellowish. |

EXAMPLE 6

About 1200 grams of the polyester described in Example 1 are heated with about 334 grams of diphenylmethane-4,4'-diisocyanate and about 384 grams of chlorobenzene to 90–98° C. for about 50 minutes and subsequently cooled to the room temperature (NCO content=2.54%).

A solution of about 20.55 grams of m-xylylenediamine in about 1165 grams of dimethylformamide is converted by the addition of solid carbonic acid into a suspension of the carbonates of m-xylylenediamine, and about 500 grams of the NCO-preadduct solution prepared as described above are introduced with intense stirring. There is obtained a clear highly viscous solution of 900 poises/20° C. which is pigmented by addition of about 24 grams of an about 33% $TiO_2$ pigment paste. Portions of the solution are treated with about 2% adipic acid-bis-(dimethylhydrazide) and cast into elastomer foils. After exposure in the Fade-O-Meter a distinct improvement of the stability to light is observed by the additive—as compared with elastomer foils without additive.

Discoloration upon exposure in the Fade-O-Meter—

| | |
|---|---|
| Without additive: | |
| 20 hours | Yellow. |
| 50 hours | Yellowish brown. |
| With additive: | |
| 20 hours | Colorless. |
| 50 hours | Yellowish. |

EXAMPLE 7

About 600 grams of the poyester described in Example 1 are heated with about 158 grams of diphenylmethane-4,4'-diisocyanate and about 189 grams of chlorobenzene to about 90–98° C. for about 50 minutes and subsequently cooled to room temperature (NCO content 2.34%).

About 500 grams of the NCO preadduct solution are added with stirring to a solution of 4,4'-diamino-diphenylmethane in about 930 grams of dimethylformamide, whereupon the viscosity rises up to 628 poises/20° C. The solution is pigmented with $TiO_2$ (rutile) to the content of 2.5% $TiO_2$ (calculated on the solids content). Upon standing for about several days the solution assumes a yellow brown colour.

A portion of solution is provided with an addition of about 2% adipic acid-bis-(as-dimethyl-hydrazine) and cast into foils, while the remainder of the solution without additive is likewise cast into foils for comparison.

Upon exposure in the Fade-O-Meter there is observed a distinct improvement of the light stability of the foils with additive as well as a marked brightening effect of the elastomer solution and the foils respectively with the addition of the light protective agent.

Discoloration upon exposure in the Fade-O-Meter—

| | |
|---|---|
| With additive: | |
| 0 hours | Yellowish brown. |
| 20 hours | Deep brown. |
| 50 hours | Do. |
| Without additive: | |
| 0 hours | Almost colorless. |
| 20 hours | Do. |
| 50 hours | Yellowish. |

What is claimed is:

1. An elastomeric polyurethane stabilized against discoloration and oxidation, comprising the reaction product of an organic polyisocyanate and a polyhydroxyl compound having a molecular weight of from about 500 to about 5000, said reaction product having incorporated therein from about 0.1 to about 15% by weight of an N,N-dialkyl-carboxylic acid hydrazide, the alkyl groups containing from 1 to 18 carbon atoms, the carboxylic acid moiety being derived from a monobasic or dibasic aliphatic, cycloaliphatic or aromatic carboxylic acid.

2. The elastomeric polyurethane of claim 1 wherein in addition to the polyhydroxyl compound and the organic polyisocyanate a chain extending agent having active hydrogen atoms which are reactive with NCO groups are employed.

3. The elastomeric polyurethane of claim 1 wherein the polyhydroxyl compound is a linear polyester having terminal hydroxy groups.

4. The elastomeric polyurethane of claim 1 wherein the polyhydroxyl compound is a linear polyether having terminal hydroxy groups.

5. The elastomeric polyurethane of claim 1 wherein the alkyl groups of the carboxylic acid hydrazide are methyl groups.

6. The elastomeric polyurethane of claim 1 wherein the carboxylic acid hydrazide is adipic acid bis-(N,N-dimethylhydrazide).

7. The elastomeric polyurethane of claim 1 wherein the carboxylic acid hydrazide is terephthalic acid bis-(N,N-dimethylhydrazide).

8. The elastomeric polyurethane of claim 1 wherein the carboxylic acid hydrazide is succinic acid bis-(N,N-dimethylhydrazide).

9. The elastomeric polyurethane of claim 1 wherein the carboxylic acid hydrazide is stearic acid N,N-dimethylhydrazide.

10. A stabilized solution of a chain extended polyurethane in an organic polar solvent containing 0.1 to 15 percent by weight based on the polyurethane of an N,N-dialkyl carboxylic acid hydrazide selected from the group consisting of adipic acid bis-dimethylhydrazide succinic acid mono-N,N-dimethyl hydrazide, stearic acid N-N-dimethyl hydrazide and terephthalic acid N,N-dimethylhydrazide.

References Cited

UNITED STATES PATENTS

| | | | |
|---|---|---|---|
| 3,149,998 | 9/1964 | Thurmaier | 260—45.9 |
| 3,305,533 | 2/1967 | Thoma et al. | 260—77.5 |
| 2,835,648 | 5/1958 | Lappin | 260—45.9 |
| 3,023,192 | 2/1962 | Shivers | 260—45.95 |
| 3,152,101 | 10/1964 | Dolce | 260—45.95 |
| 3,261,190 | 1/1967 | Reischl | 260—45.9 |

FOREIGN PATENTS

| | | |
|---|---|---|
| 1,105,157 | 4/1961 | Germany. |
| 909,753 | 11/1962 | Great Britain. |

HOSEA E. TAYLOR, Jr., Primary Examiner

U.S. Cl. X.R.

8—115.6; 117—130.5, 138.8; 260—2.5, 29.1, 32.6, 37, 45.9, 75, 77.5